(12) United States Patent
Gulla et al.

(10) Patent No.: US 7,601,216 B2
(45) Date of Patent: *Oct. 13, 2009

(54) GAS DIFFUSION ELECTRODES, MEMBRANE-ELECTRODE ASSEMBLIES AND METHOD FOR THE PRODUCTION THEREOF

(75) Inventors: Andrea F. Gulla, Malden, MA (US); Robert J. Allen, South Harwich, MA (US)

(73) Assignee: BASF Fuel Cell GmbH, Frankfurt Am Main (DE)

( * ) Notice: Subject to any disclaimer, the term of this patent is extended or adjusted under 35 U.S.C. 154(b) by 854 days.

This patent is subject to a terminal disclaimer.

(21) Appl. No.: 11/248,080

(22) Filed: Oct. 12, 2005

(65) Prior Publication Data

US 2006/0234111 A1 Oct. 19, 2006

Related U.S. Application Data

(60) Provisional application No. 60/671,336, filed on Apr. 14, 2005.

(51) Int. Cl.
*C30B 25/02* (2006.01)
(52) U.S. Cl. .................. 117/92; 117/97; 117/103; 117/108; 427/115; 427/497; 427/523; 427/564; 429/40; 429/41; 429/44; 204/283; 204/284; 204/290.14; 502/101; 29/623.1

(58) Field of Classification Search ............... 204/283, 204/284, 290.14; 429/40, 44, 30, 33, 41; 117/92, 97, 103, 108; 427/115, 497, 523, 427/564; 502/101; 29/623.5
See application file for complete search history.

(56) References Cited

U.S. PATENT DOCUMENTS

| 4,229,490 A | 10/1980 | Frank |
| 5,686,150 A | 11/1997 | Matsumoto |
| 5,702,839 A | 12/1997 | Frost |
| 6,077,621 A * | 6/2000 | Allen et al. ............ 429/33 |
| 6,673,127 B1 * | 1/2004 | Allen et al. ............ 29/623.1 |
| 7,419,546 B2 * | 9/2008 | Gulla et al. ............ 117/92 |
| 2001/0033960 A1 | 10/2001 | Cavalca |
| 2004/0018937 A1 | 1/2004 | Trabold |
| 2008/0254342 A1 * | 10/2008 | Gulla et al. ............ 429/44 |
| 2008/0311435 A1 * | 12/2008 | Gulla et al. ............ 429/12 |

FOREIGN PATENT DOCUMENTS

| EP | 0 860 888 A | 8/1998 |
| WO | WO 2005/124905 A | 12/2005 |

* cited by examiner

*Primary Examiner*—Bruce F Bell
(74) *Attorney, Agent, or Firm*—Charles A. Muserlian

(57) ABSTRACT

A method for forming a patterned noble metal coating on a gas diffusion medium substantially free of ionomeric components comprising subjecting an electrically conductive web with a patterned mask overlaid thereto to a first ion beam having an energy not higher than 500 eV, and to a second beam having an energy of at least 500 eV, containing the ions of at least one noble metal and a gas diffusion electrode.

16 Claims, 3 Drawing Sheets

GAS DIFFUSION ELECTRODES, MEMBRANE-ELECTRODE ASSEMBLIES AND METHOD FOR THE PRODUCTION THEREOF

The application claims the benefit of U.S. provisional patent application Ser. No. 60/671,336 filed Apr. 14, 2005.

FIELD OF THE INVENTION

The invention relates to gas diffusion electrodes for use in fuel cells and other electrochemical applications, and to the relevant method of production.

BACKGROUND OF THE INVENTION

Proton exchange membrane fuel cells (PEMFC) are considered to be one of the most promising sources of clean electrical energy for the near future. PEMFC are electrochemical generators which produce direct electrical current from a gaseous fuel (typically hydrogen, pure or in admixture) and a gaseous oxidant, normally consisting of oxygen or air. The core component of the cell is the membrane-electrode assembly, consisting of an ion-exchange membrane, which is the solid electrolyte supporting the whole process and the physical separator of the anode and cathode cell compartments, bonded or otherwise coupled to gas diffusion electrodes. The gas diffusion electrodes, one cathode and one anode contacting either side of the ion-exchange membrane, usually comprise a gas diffusion medium and a catalyzed layer.

Several kinds of technical solutions are known from the prior art for these components: the catalyzed layers are in some cases applied to the gas diffusion media prior to the coupling with the membrane, and/or they are directly coated on the membrane surface prior to the application of uncatalyzed gas diffusion media thereon. The gas diffusion medium usually comprises an electrically conductive web and one or more gas diffusion layers. The conductive web can be metallic or carbon-based, and may consist of a metal mesh, foam or cloth, of a woven or non-woven carbon cloth, of a carbon paper or of any other preferably porous or perforated medium.

Gas diffusion layers are provided to supply suitable paths for the diffusion of gaseous reactants inside the electrode structure toward the catalytic sites whereupon the electrochemical reactions of fuel oxidation (anode side) and oxidant reduction (cathode side) occur. They are usually based on mixtures of electrically conductive inert fillers (for instance, carbon particles) and suitable, preferably hydrophobic binders (for instance, PTFE or other fluorinated binders). Gas diffusion layers should be carefully designed to provide a permeable and smooth structure, to ensure a correct apportionment of the gaseous reactants without incurring heavy mass transport penalties, and to provide a good contact with the membrane.

Improved gas diffusion structures for fuel cells are for instance disclosed in U.S. Pat. No. 6,103,077. A catalyzed layer can then be applied to the gas diffusion layers, for instance as described in U.S. Pat. No. 6,017,650. Catalyzed layers of the prior art comprise noble metal catalysts such as platinum, optionally supported on carbon or graphite particles, a suitable binder, which can be the same hydrophobic binder already present in the gas diffusion layers, and an ionomeric component, usually an ionomeric perfluorocarbon species. The ionomeric component can be added to the catalyst-binder mixture and/or it can be applied subsequently as an external layer wetting the pre-applied catalyst and binder particles. Gas diffusion electrodes of this kind, coupled to proton-exchange membranes known in the art, for instance based on fluorocarbon acids such as Nafion® (a trademark of U.S. company DuPont), give rise to membrane-electrode assemblies characterized by excellent performances. Nevertheless, the noble metal component is exploited to such a low extent in structures of this kind, that very high specific loadings are required (usually in the range of 0.3 to 1 $mg/cm^2$ of platinum both for the anode and for the cathode side in commercially available products). The high amount of noble metal required for obtaining suitable performances in fuel cells is perhaps the single most important factor preventing PEMFC (and other types of fuel cells such as DMFC, direct methanol fuel cells) from having a commercial success.

Direct metallization of ion-exchange membranes with a catalyst layer has been proposed as a means to achieve a better catalyst-membrane interface, allowing a better catalyst exploitation and therefore, the use of lower noble metal loadings. However, no means for direct metallization of membranes has proven effective and practical up to now. High temperatures required by sputtering or ultra high vacuum deposition (UHV) are destined to impart consistent damages to the delicate ion-exchange membranes, and even the common physical and chemical vapor deposition techniques (PVD or CVD) have proven too difficult to control and cumbersome to scale up.

A substantial improvement in the metallization of membranes is disclosed in U.S. Pat. No. 6,077,621, wherein the use of dual IBAD is proposed for this purpose. Dual IBAD, which is an evolution of the Ion Beam Assisted Deposition (IBAD) technique, has the advantage of being a low temperature process and very easy to scale up. The membrane is initially cleaned and textured by a first low-energy ion beam, for instance, an $Ar^+$ beam, having an energy not higher than 500 eV; a second beam is then focused on the membrane, containing higher energy ions (such as $O_2^+$ or $N_2^+$) together with the ions of the metals to be deposited, previously evaporated by means of an electron beam. Dual IBAD is much advantageous also over conventional IBAD (in which a single beam is used), in that it allows the formation of a better controlled film with the required density and porosity while imparting a minimum stress to the membrane structure.

Since the handling of a large sized ion-exchange membrane in a continuous metallization process is not very easy, a further improvement of this technique has been disclosed in U.S. Pat. No. 6,673,127. In this case, a very thin ion-exchange membrane layer is formed on a gas diffusion structure, and then subjected to dual IBAD. Although this technique allows to obtain high power densities in fuel cells with reduced platinum loadings, it still presents some disadvantages that the present invention wishes to address. Firstly, although the performances of these electrodes can be high, they can be somewhat unpredictable since the reliability of this technique is affected by the characteristics of the ionomer film, which can vary according to the preparation conditions. The state-of-the-art liquid ionomer film is of fluorocarbonic nature, since this is the only known ionomeric material that would allow high power density operation, and it has to be recast from an alcoholic or hydroalcoholic suspension of a fluorocarbon acid such as the product commerciallised as "Liquid Nafion" by Dupont.

The nature of these suspensions is not always consistent, since average molecular weight, morphological parameters of the suspended particles, rheological parameters and other factors may vary in a remarkable fashion from one batch to the other. Moreover, also in the best cases, the utilization factor of the catalyst with liquid ionomer-embedded particles does never approach unity. Liquid ionomers for gas diffusion electrodes were first described in U.S. Pat. No. 4,876,115 as a means for extending the proton conduction paths within the interstitial spaces of a three-dimensional catalytic layer, thereby improving the utilization factor of the catalyst (which is a measure of the availability and accessibility of the catalyst itself as a site for the desired reaction.) This approach is effective up to a certain extent, only mimicking the ideal situation whereby all the catalyst is present in a very thin and smooth, quasi-two-dimensional layer, in direct contact with the membrane surface.

Besides solving the issue of lowering the platinum loading (or more generally the noble metal loading) in fuel cell electrodes, another problem which should be addressed is the low stability of fluorocarbon-based ionomeric components in membrane-electrode assemblies at certain process conditions. In some applications (such as automotive ones), fuel cells are operated in a discontinuous fashion depending on the instant power demand. Since PEMFC are known for their very quick start-up and their remarkable ability of following the requirements of steeply variable power demand, thay are the most promising candidate for operating in this field. However, in conditions of zero or near-zero power demand, i.e. when little or no current is generated (open circuit voltage conditions), a consistent generation of peroxides on the anode side is likely to take place. Perfluorocarbon materials are often unstable in these conditions, especially over long times. Also for this reason, alternative membranes (for instance based on polybenzimidazole, polyetherketones or polysulphones) have been developed for fuel cell applications.

In any case, none of these materials has proven suitable for being employed as a proton conducting material for the electrode interface according to the teaching of U.S. Pat. No. 4,876,115 and perfluorocarbon materials such as the aforementioned "Liquid Nafion" are always used. The elimination of this component would therefore be beneficial for many reasons, not only of cost and reliability, but also of overall chemical stability at certain process conditions.

For all the above reasons, direct metallization of gas diffusion media was attempted with several different techniques in the past. U.S. Pat. No. 6,159,533 claims that excellent performances are obtainable with a PVD deposition of platinum on a gas diffusion medium, even though the examples show that the actual recorded performances don't go beyond a modest 732 mA/cm$^2$ at 0.358 V in a fuel cell provided with a very thin membrane (20 microns), fed with a very high gas flow-rate (3.5 stoichiometric ratio on air, 2 stoichiometric ratio on pure hydrogen) at a relatively high pressure (about 2 bar).

A more interesting result was obtained with the invention disclosed in the co-pending U.S. Provisional Patent Application Ser. No. 60/580,739, consisting of a gas diffusion medium, free of ionomeric components, provided with a noble metal coating by means of a dual IBAD deposition. The electrochemical performances detected in a fuel cell with this type of electrode and a Nafion 112 ion-exchange membrane (0.3 A/cm$^2$ at about 0.8 V and 0.7 A/cm$^2$ at about 0.7 V feeding pure hydrogen and air at 1.5 bar a, at a stoichiometric ratio of 2 and with a cell temperature of 80° C.) are certainly closer to those expected for a real industrial application. However, some undesired limitations can be noticed with this type of electrode at higher current densities (around 1 A/cm$^2$), as cell voltage tends to drop suddenly due to the onset of diffusive limitations. Most likely, the diffusion rate of the gaseous reactants through the noble metal coating obtained by dual IBAD is not sufficient to sustain operation above a certain current density.

OBJECT OF THE INVENTION

It is an object of the invention to provide a gas diffusion electrode obtained by dual IBAD deposition of noble metal on a gas diffusion medium overcoming the limitations of the prior art.

It is an another object of the invention to provide a gas diffusion electrode obtained by direct metallization of a gas diffusion medium with low platinum loading characterized by very high performances, especially at high current density, preferably free of ionomeric fluorocarbon components, and a membrane-electrode assembly incorporating the same.

It is a further object of the invention to provide a method for forming a patterned noble metal coating on a gas diffusion medium by direct metallization. These and other objects and advantages of the invention will become obvious from the following detailed description.

THE INVENTION

Under one aspect, the gas diffusion electrode of the invention consists of a gas diffusion medium, free of ionomeric components, provided with a patterned noble metal coating by means of a dual IBAD deposition. It has been surprisingly found that the performances of the gas diffusion electrode can be greatly enhanced by depositing the metal catalyst coating according to well-chosen patterns, leaving a substantial portion of the gas diffusion medium uncovered (and thus uncatalysed). In other words, provided an appropriate geometry is chosen for the catalyst deposition, the loss of catalytic activity in the uncatalysed zones results more than compensated by the enhanced permeability introduced by the discontinuity in the metal coating.

The patterned geometry of the metal coating for the electrode of the invention can be obtained by a modification of the method disclosed in the above cited Provisional Patent Application Ser. No. 60/580,739, incorporated herein as reference in its entirety. The method for forming a patterned noble metal coating on a gas diffusion medium consists of subjecting an electrically conductive web to a dual ion beam, after overlaying a suitable mask on the web. The dual ion beam is substantially the same disclosed in the above cited Provisional Patent Applicatiom Ser. No. 60/580,739, with a first ion beam having an energy not higher than 500 eV (more preferably between 100 and 500 eV), and a second beam of higher energy (not lower than 500 eV, more preferably between 500 and 2000 eV) containing the ions of the noble metal to be deposited.

The mask overlaid to the conductive web is typically a foraminous element presenting the negative of the pattern which must be obtained for the metal coating and in a most preferred embodiment, the mask is a thin metal sheet provided with holes, for instance by means of a chemical etching, selectively filtering the ions of the dual beam so that they may be deposited on the web only in correspondence of the holes. In another preferred embodiment, the mask consists of a polymer sheet provided with suitable holes.

Surprisingly, the optimum geometrical parameters for the patterned noble metal coatings of the invention result in a quite coarse geometry, the best results being obtained when the main lattice parameter (which can be identified as the distance between the centers of two adjacent holes in the mask) is in the order of magnitude of a few tens of a millimeter to a few millimeters. In a pereferred embodiment, the distance between the centers in adjacent couples of holes is between 0.02 and 0.5 cm. In a preferred embodiment, the method of the invention is preferably practiced making use of a patterned mask with an open ratio between 30 and 80% and in this context, the term open ratio indicates the ratio between the area corresponding to the holes and the total area of the mask, as known in the art. In a preferred embodiment, the patterned mask is implemented as a grid, in particular as a polygonal grid, for instance, comprised of equally spaced polygonal holes, so that the resulting metal coating consists of a pattern of equally spaced polygons. In a still more preferred embodiment, the polygonal grid consists of equally spaced polygons with a filled round center, so that the resulting metal coating consists of a pattern of equally spaced polygons with a round hole at their center. In this way, the catalyst utilization factor is surprisingly enhanced since there is a comparatively higher fraction of catalyst exposed at the edges, and the local permeability of the coating is more uniform.

The thickness of the pattern noble metal coating of the invention is preferably comprised between 5 and 250 nm, and the corresponding loading between 0.01 and 0.3 $cm^2$. A thickness toward the high end of this range is more advantageous compared to the analogous case of continuous (non-patterned) coating disclosed in the co-pending Provisional U.S. Patent Application Ser. No. 60/580,739 since in the present case, the coating grows as an array of three dimensional elements (prisms or cylinders or other shapes characterized by vertical walls, depending on the geometry of the mask), whose vertical walls are easily accessible to the gaseous reactants thereby increasing the useful catalytic surface.

In one preferred embodiment, the gas diffusion electrode of the invention comprises a gas diffusion medium essentially consisting of an electrically conductive web and a gas diffusion layer as known in the art and conductive web can be, for instance, a carbon cloth or paper, and the gas diffusion layer optionally comprises one or more electroconductive fillers (for instance carbon particles) and at least one binder, preferably hydrophobic. In one more preferred embodiment, acetylene black carbon particles are used as the electroconductive filler in the gas diffusion layer and in another preferred embodiment, a fluorinated binder (e.g. PTFE) is used in the gas diffusion layer.

It is highly preferred that the gas diffusion layer be as smooth as possible to exploit the patterned noble metal coating as much as possible by providing the best possible contact with the smooth surface of an ion-exchange membrane. In one preferred embodiment, the gas diffusion layer has a smoothness of at least 1000 Gurley-seconds. The gas diffusion electrode of the invention is used for the preparation of membrane-electrode assemblies comprising an ion-exchange membrane as known in the art and the ion-exchange membrane may be coupled with one or two gas diffusion electrodes of the invention in intimate contact with one side thereof or with either sides, respectively. Such intimate contact is preferably obtained by hot-pressure bonding.

DETAILED DESCRIPTION OF THE DRAWINGS

Figure 1:
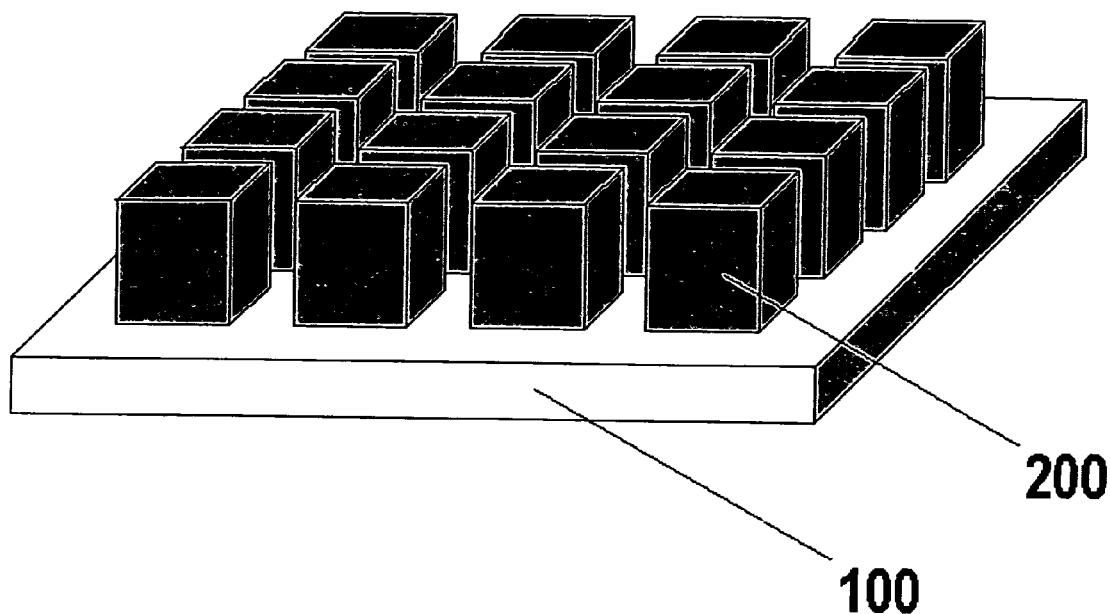
FIG. 1 is a three dimensional view of patterned noble metal coating according to two distinct preferred embodiments of the invention.
Figure 1:
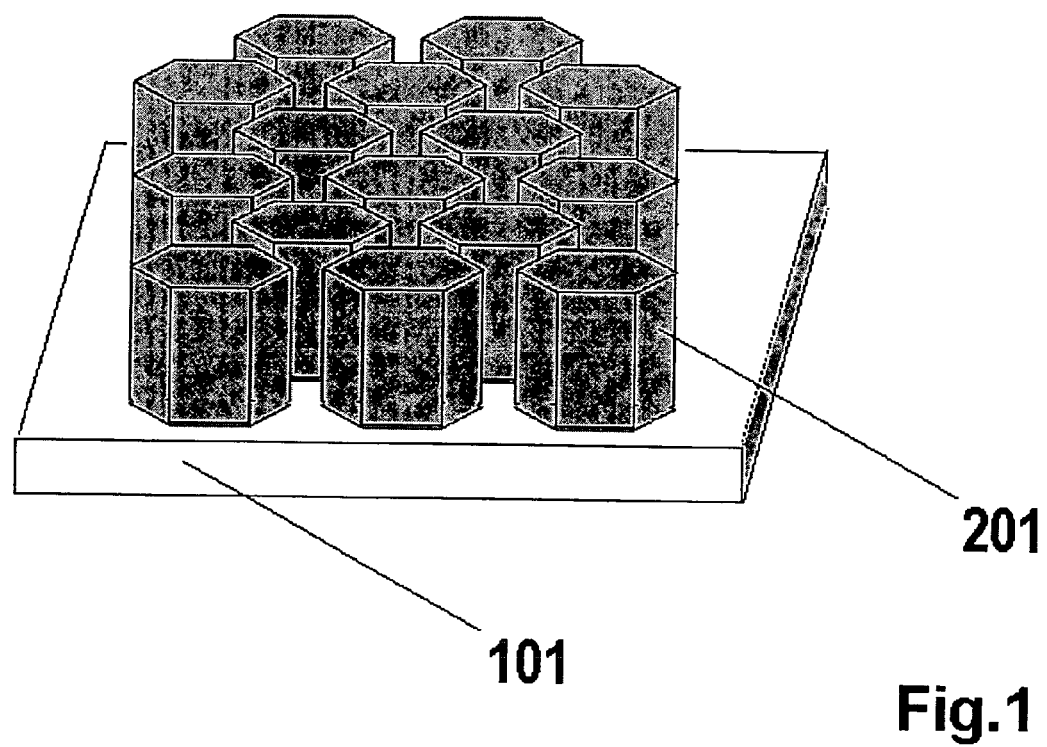

Two possible embodiments of the patterned noble metal coating of the invention are depicted in FIG. 1. The two drawings are sketches not reflecting the actual proportions of the illustrated elements, which are exaggerated for an easier understanding of the gist of the invention. The upper part of the figure shows a gas diffusion medium (100), optionally a carbon cloth provided with a smooth gas diffusion layer consisting of carbon particles mixed with a suitable binder, whereon a patterned coating (200) in the form of square base parallelepipeds is grown. This kind of coating is obtainable by overlaying a mask, for instance a metal sheet in form of a polygonal grid provided with equally spaced square holes, onto the gas diffusion medium (100), as will be evident to one skilled in the art.

In the lower part of the figure, another gas diffusion medium (101) is shown coated with a patterned coating (201) in the form of hexagonal-base parallelepipeds and such a patterned coating (201) is obtainable much in the same way as the pattern coating (200), with the difference that the polygonal grid of the metal sheet used as the overlaid mask must be provided with hexagonal holes.

Figure 2:
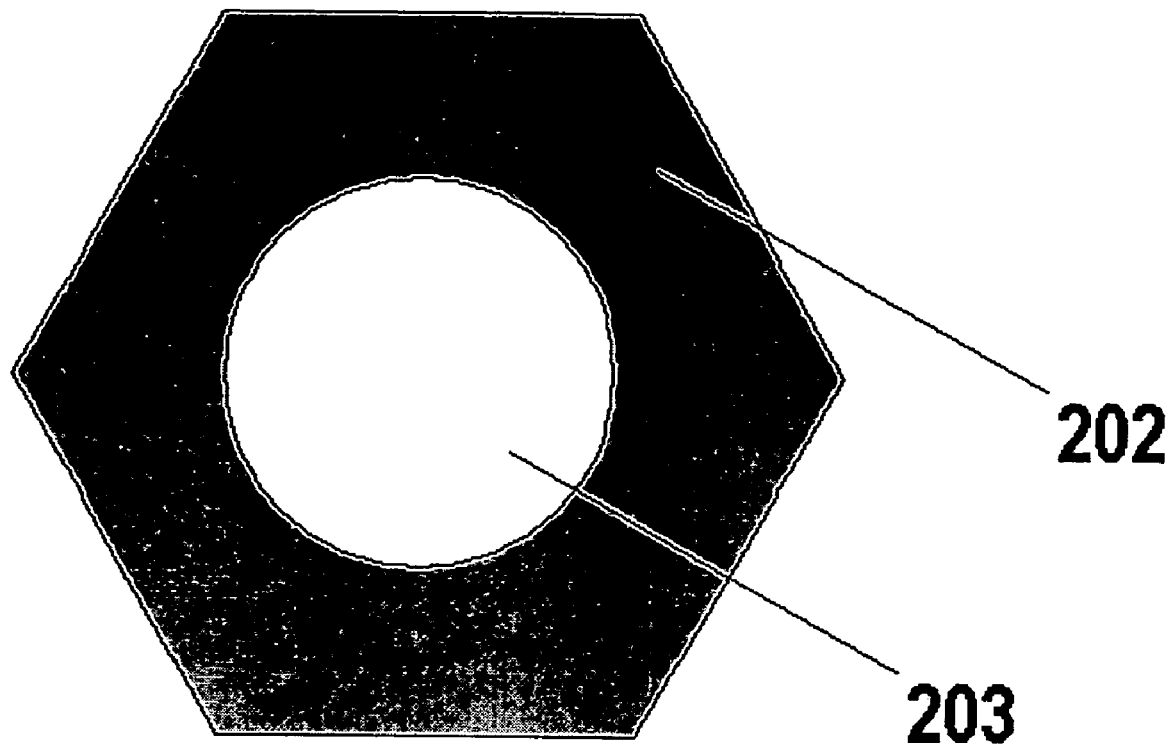
FIG. 2 is a top-view of a repeating element of patterned noble metal coating according to one preferred embodiment of the invention.
Figure 3:
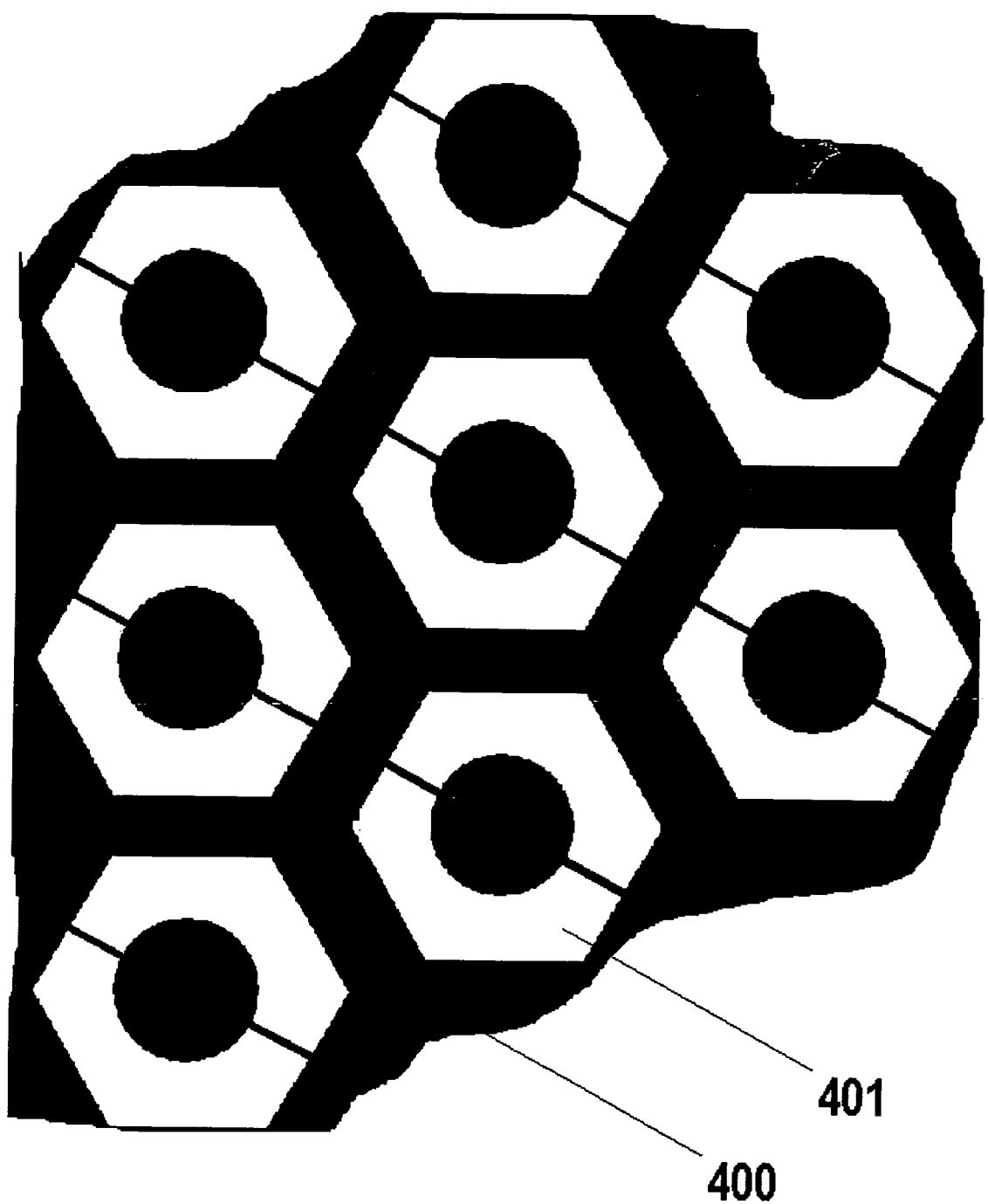
FIG. 3 is a mask for obtaining the patterned noble metal coating of FIG. 2 according to the method of the invention.

According to one much preferred embodiment, the patterned coating of the invention is in the form of equally spaced polygons having a hollow center. In this case, the top view of each repeating element of the pattern coating (201) is like the one depicted in FIG. 2, wherein (202) indicates the calalyst-filled portion, and (203) indicates a hollow portion delimiting a round hole center. Such a pattern coating is, for instance, obtainable by using the polygonal grid of FIG. 3 as overlaid mask, wherein (400) indicates the solid portion and (401) the hollow portion of the grid. A pattern coating of equally spaced polygons, preferably hexagons, having a round hole center is a practically preferred embodiment of the invention, but other kinds of patterns can be advantageously applied without departing from the scope of the invention.

In the following examples, there are described several preferred embodiments to illustrate the invention. However, it should be understood the invention is not intended to be limited thereto.

EXAMPLE 1

A series of gas diffusion electrodes was prepared according to the Example of the cited U.S. Provisional Patent Application Ser. No. 60/580,739, the difference being that a series of masks were interposed between the gas diffusion medium and the IBAD source to obtain patterned noble metal coatings. Platinum was selected as the noble metal to apply, as in the case of the cited application. A gas diffusion medium was selected consisting of a three-dimensional woven carbon cloth coated with a mixture of Shawinigan Acetylene Black carbon particles and PTFE, for a total thickness of 410 microns, a basis weight of 210 $g/m^2$, a density of 0.54 $g/cm^3$, an electrical resistivity of 525 mΩcm, an air permeability of 0.84 Gurley, a porosity of 25 microns with a mean pore size of 6 microns and an average smoothness of 5000 Gurley seconds. The gas diffusion medium so obtained was divided into equivalent pieces, each of which were subjected to dual IBAD deposition of platinum metal after overlaying a suitable patterned mask consisting of a chemically etched stainless steel sheet. A first low-energy beam of 200 to 500 eV was applied to clean and partially texture the surface, and a platinum ion of 1000-2000 eV was subsequently applied until growing coatings of approximately 0.08 $mg/cm^2$ of platinum, corresponding to an overall thickness of about 50 nm. Nine different hexagonal grids in accordance with the disclosure of FIG. 3 were used, having the lattice parameters listed in Table 1:

TABLE 1

| Sample | Open Area | Mesh Diameter | Hole-to-Hole distance |
|---|---|---|---|
| A | 70% | 0.0508 cm | 0.1854 cm |
| B | 70% | 0.1016 cm | 0.1169 cm |
| C | 70% | 0.1524 cm | 0.1723 cm |
| D | 50% | 0.0508 cm | 0.0686 cm |
| E | 50% | 0.1016 cm | 0.1372 cm |
| F | 50% | 0.1524 cm | 0.2057 cm |
| G | 30% | 0.0508 cm | 0.089 cm |
| H | 30% | 0.1016 cm | 0.1778 cm |
| I | 30% | 0.1524 cm | 0.2642 cm |
| X(reference) | 100% | no grid | none |

The tenth electrode in Table 1 (Sample X) was obtained without any grid interposed (according to the invention disclosed in the cited U.S. Provisional Application No. 60/580/739), with the same platinum loading as the electrodes in Table 1.

The electrodes obtained were used to prepare a series of corresponding membrane-electrodes assemblies, upon bonding them via hot pressing procedure (for 10 minutes at 120° C. and 25 bar a) to samples of Nafion® 112 membrane in "sandwich-like" fashion. No liquid ionomer or other proton conductor was added in the manufacture of these assemblies. The membrane-electrode assemblies were then characterized in a lab fuel cell under a 1 A/cm² direct current generation, upon feeding pure hydrogen and air at 1.5 bar a, at a stoichiometric ratio of 2 and with a cell temperature of 80° C. After stabilizing the electrochemical conditions of the fuel cell, the cell voltages reported in Table 2 were recorded for the different samples.

TABLE 2

| Sample | Cell voltage (mV) |
|---|---|
| A | 600 |
| B | 580 |
| C | 550 |
| D | 510 |
| E | 330 |
| F | 330 |
| G | 480 |
| H | 460 |
| I | 250 |
| X | 230 |

In the description and claims of the present application, the word "comprise" and its variations such as "comprising" and "comprised" are not intended to exclude the presence of other elements or additional components. Various modification of the method and gas diffusion electrodes maybe made without departing from the spirit or scope thereof and it is to be understood that the invention is intended to be limited as defined in the appended claims.

The invention claimed is:

1. A method for forming a patterned noble metal coating on a gas diffusion medium substantially free of ionomeric components comprising subjecting an electrically conductive web with a patterned mask overlaid thereto to a first ion beam having an energy not higher than 500 eV, and to a second beam having an energy of at least 500 eV, containing the ions of at least one noble metal.

2. The method of claim 1 wherein said patterned mask is a thin metal sheet or polymer film provided with holes.

3. The method of claim 2 wherein said thin patterned mask is chemically etched thin metal sheet.

4. The method of claim 2 wherein the distance between the centers in adjacent couples of said holes is between 0.02 and 0.5 cm.

5. The method of claim 1 wherein said patterned mask has an open ratio between 30 and 80%.

6. The method of claim 1 wherein said patterned mask is a polygonal grid.

7. The method of claim 6 wherein said polygonal grid comprises equally spaced polygonal holes, optionally hexagonal holes, with a circular filled center, and the resulting patterned noble metal coating is comprised of equally spaced polygons, optionally hexagons, having a round hole center.

8. The method of claim 1, wherein the patterned noble metal coating has a thickness between 5 and 250 nm and a loading of 0.01 to 0.3 mg/cm².

9. The method of claim 1 wherein said first ion beam has an energy comprised between 100 and 500 eV and said second ion beam has an energy comprised between 500 and 2000 eV.

10. The method of claim 1 wherein said at least one noble metal is platinum.

11. A gas diffusion electrode comprising an electrically conductive web, a non catalyzed gas diffusion layer comprising at least one electroconductive filler and at least one optionally fluorinated binder, and a patterned noble metal coating obtained by the method of claim 1.

12. The gas diffusion electrode of claim 11 wherein said electroconductive filler comprises carbon particles.

13. The gas diffusion electrode of claim 11 wherein the electroconductive filler is acetylene black carbon particles.

14. The gas diffusion electrode of claim 12 wherein said gas diffusion layer has a smoothness of at least 1000 Gurley-seconds.

15. A member-electrode assembly comprising at least one gas diffusion electrode of claim 11 and an ion-exchange membrane.

16. The membrane-electrode assembly of claim 14 wherein said at least one gas diffusion electrode and said ion-exchange membrane are mutually bonded by hot pressing.

* * * * *